UNITED STATES PATENT OFFICE.

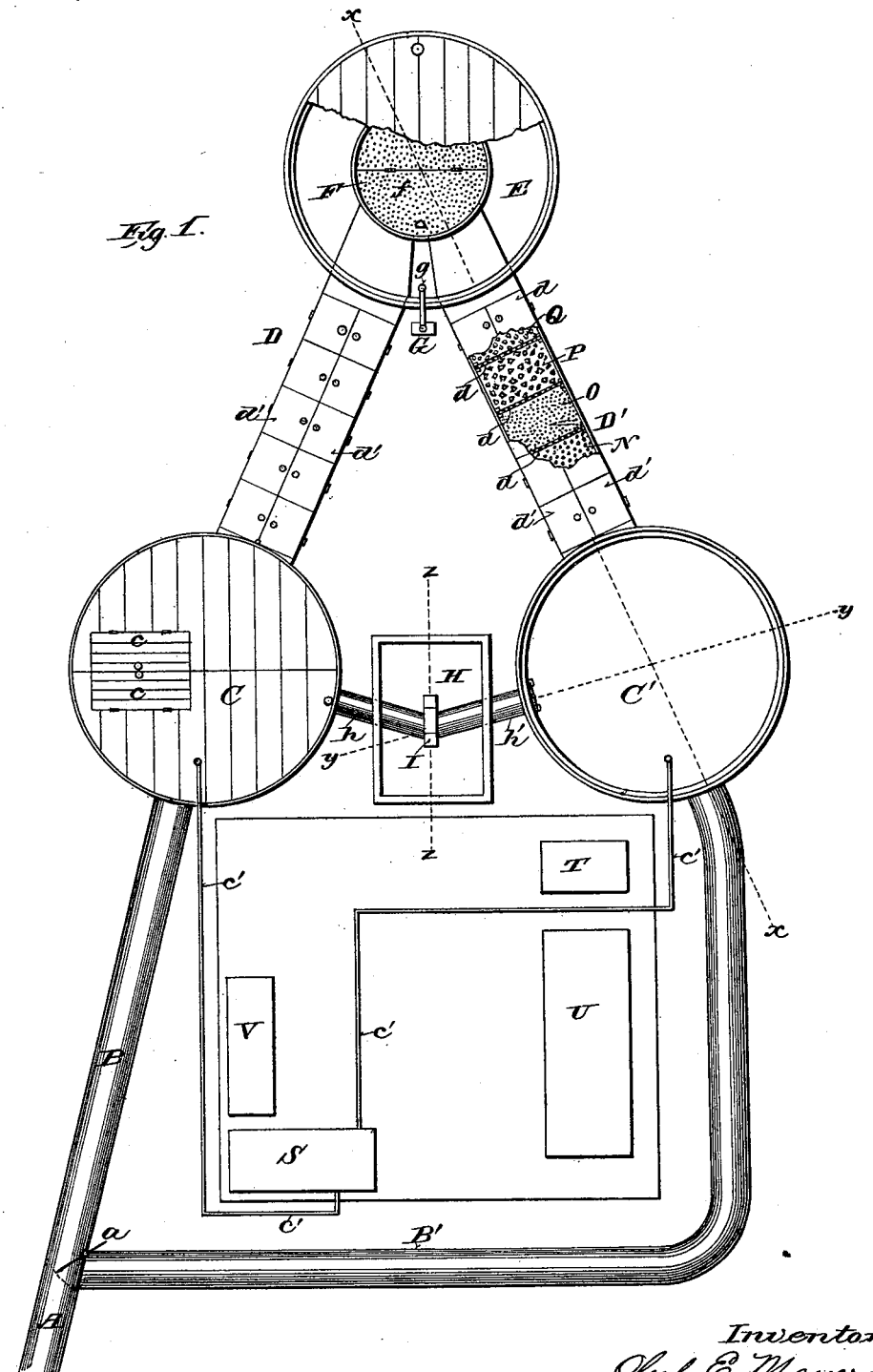

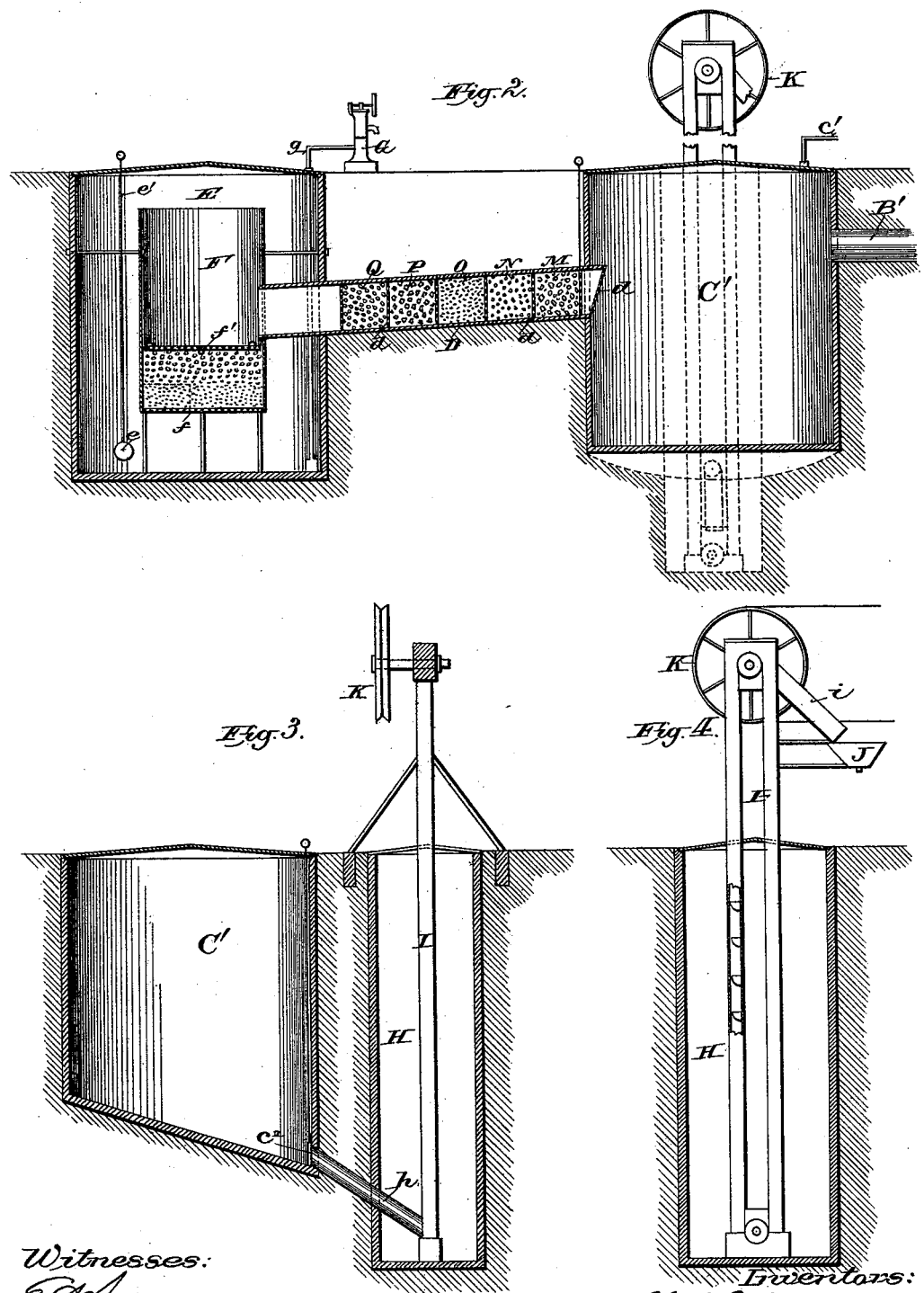

OLUF E. MEYER AND CHARLES H. WECK, OF MILWAUKEE, WISCONSIN.

APPARATUS FOR TREATING SEWAGE.

SPECIFICATION forming part of Letters Patent No. 403,946, dated May 28, 1889.

Application filed October 5, 1888. Serial No. 287,341. (No model.)

*To all whom it may concern:*

Be it known that we, OLUF E. MEYER and CHARLES H. WECK, of Milwaukee, in the county of Milwaukee and State of Wisconsin, have invented certain new and useful Improvements in Apparatus for Separating the Solid from the Liquid Part of Sewage; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of our invention is to separate the solid from the liquid part of sewage and to render the liquid inoffensive.

It consists, essentially, of a tank or settling-chamber into which the sewage is discharged, a filter communicating with said chamber, means for removing the solid matter from the settling-chamber, and other peculiarities of construction and arrangement hereinafter specifically set forth, and pointed out in the claims.

In the accompanying drawings, like letters designate the same parts in the several figures.

Figure 1 is a plan view of our improved apparatus. Fig. 2 is a vertical section of the same on the line $x\ x$, Fig. 1. Fig. 3 is a similar section on the line $y\ y$, and Fig. 4 is a section on the line $z\ z$.

A represents the sewer-main connected by branches B B' with settling chambers or tanks C C', which may be built of brick or other suitable material underground, in position to receive the sewage directly from the sewer, or they may be otherwise conveniently located and the sewage pumped or carried into them by any suitable means.

D D' are filter-boxes or conduits leading out of the settling-chambers C C' at the sides opposite the branches B B' which connect with said chambers as near the top thereof as practicable and just above the level of the openings into said conduits D D'.

E is a well similar in construction to the settling-chambers C C', but preferably somewhat deeper. A cage, F, having a perforated or screen bottom, $f$, and a removable or hinged horizontal screen, $f'$, above the bottom, is supported and secured by suitable means in the middle of said well and at a distance from the bottom thereof. The filter-boxes or conduits D D' have a downward pitch or inclination to insure the flow of liquid through the same, and they connect with and open into the cage F above the screen $f'$ therein. The ends of said filter-boxes opening into the settling-chambers are covered with screens $d^2\ d^2$, and are inclined, as shown in Fig. 2, so as to give a downward pitch to said screens and prevent the accumulation thereon of refuse drawn against them by the outflowing liquid. These boxes are divided transversely by screens $d\ d$ into a number of compartments, which are filled in the order named, beginning next to the settling-chambers, with coarse gravel M, finer gravel N, and sand O, or with any other suitable straining materials. The compartments next succeeding are filled, in the order named, with broken limestone, P, and coarsely comminuted charcoal, Q, or other suitable deodorizing agents.

The conduits D D' are provided, adjacent to the several compartments into which they are divided by the screens $d^2\ d^2$, with removable sections or doors $d'\ d'$, by means of which the several filtering and deodorizing materials may be easily renewed from time to time and the sediment removed from each of the several compartments without disturbing the contents of the others. The screens $d\ d$ are preferably removable to facilitate cleaning or replacing the same.

We prefer to use in the filter-boxes lake gravel, which is more even and better suited for the purpose than other kinds. The space between the perforated bottom $f$ and screen $f'$ in cage F is filled with layers of coarse gravel, charcoal, broken limestone, and coarse gravel in the order named, beginning at the bottom.

G represents a pump connected by a pipe, $g$, with the bottom of well E, for the purpose of removing the water therefrom, or in place of the pump any other suitable means may be employed to remove the water from said well.

$e$ is a float placed in the well E and provided with a rod, $e'$, which passes up through the cover of said well and indicates the height of the water therein. At the ends of the filter-boxes D D' connected with the settling-chambers C C' clear spaces are left between the screens $d^2$ and the adjacent partition-screens $d'$, as shown in Fig. 2.

$c^3$ are slides provided with handles projecting above or outside of the settling-chambers and arranged to close the openings into said filter-boxes from the settling-chambers for the purpose of stopping the flow of liquid through the same when the filtering or deodorizing material is being changed.

Referring to Figs. 3 and 4, H represents an elevator-well located between the settling-chambers C C', as shown in Fig. 1, and made somewhat deeper than said chambers. In this well is placed an elevator, I, or other suitable hoisting apparatus. The settling-chambers C C' are connected at the bottom with the lower end of the elevator I, as shown in Fig. 3, by pipes or conduits $h\ h'$. The bottoms of the settling-chambers are preferably inclined downwardly toward the elevator-well, and a downward inclination is given to the pipes $h\ h'$, which open out of the lowest portions of said chambers, so as to completely drain the same when communication is established between them and the elevator.

$c^2$ are slides arranged to close the openings into pipes $h\ h'$, when desired, and provided with rods extending upwardly through the covers of the chambers for the purpose of operating said slides. The covers of the settling-chambers are provided with removable sections or doors $c\ c$, through which access is had thereto.

The elevator I is composed, in the usual manner, of an endless belt passing at the top and bottom over drums or pulleys and provided at intervals with flights or buckets which are inclosed in a suitable casing. At the upper end the case is formed with a spout, $i$, arranged to discharge into a hopper, J, from which the semi-fluid sewage may be drawn into wagons to be carried away, or from which it may be conducted by a suitable conveyer to drying apparatus, hereinafter described.

The shaft of the upper elevator drum or pulley is provided with a pulley, K, which is connected with and driven by any convenient source of power.

$c'\ c'$ are pipes leading out from the tops of the settling-chambers C C' into a furnace, S, as shown in Fig. 1, for the purpose of conducting the noxious gases generated and accumulated in said chambers into the furnace, where they are consumed and thus prevented from bursting the walls or covers of said chambers or escaping into and contaminating the surrounding atmosphere. At the junction of the branches B B' with the sewer-main A we provide a gate or valve, $a$, arranged to close either branch and at the same time direct the contents of the sewer into the other branch; or in case of an unusually large flow of sewage, occasioned by rains, surface-water, or flushing, the valve $a$ may be set in a middle position and the sewage discharged from the main into both branches. If desired, the semi-fluid sediment taken from the settling-chambers may be pressed and dried to facilitate its transportation to greater distances. For this purpose a plant may be provided in connection with the apparatus, as illustrated in diagram in Fig. 1, in which T represents a press, U a drier, S a furnace and boiler, and V an engine, the boiler furnishing steam for operating the drier and running the engine and the engine furnishing power for operating the press and drier and for driving the pump G. In case the sewage is to be dried in this manner, suitable connections may be made between the elevator and press.

Our apparatus operates as follows: Ordinarily the gate $a$ is set to direct the sewage from the main entirely into one of the branches—as, for instance, into the branch B'—through which it is discharged into the upper part of the settling-chamber C'. The opening at the bottom of the settling-chamber into the elevator is closed by the slide $c^2$. The solid matter in the sewage settles to the bottom and is retained in said chamber, while the liquid portion, rising therein to the opening into the filter-box D', flows through the screen $d^2$, which excludes therefrom any refuse floating in the liquid. The inclination of the screens $d^2$ allows such refuse as is drawn against them by the outflowing liquid to fall away therefrom, and thus tends to keep the openings into the filter-boxes clear. As the liquid filters through the gravel M N and sand O, the solid particles are caught and retained by it, and, percolating through the limestone P and charcoal Q, it is deodorized and further defecated. Discharged at the lower end into the cage F, it passes through the gravel, limestone, and charcoal therein, and any remaining sediment, dregs, and odor are thereby removed from the water, which finally issues therefrom into the well E free from disagreeable or injurious odor, gases, dregs, or sediment. When the sediment in the settling-chamber C' has nearly reached the level of the opening into the filtering-box D', the gate $a$ is shifted and the sewage diverted from branch B' into the branch B, which discharges the same into the settling-chamber C. The pipe $h'$, connecting the settling-chamber C' with the elevator, is now opened, and the semi-fluid sediment in said chamber is allowed to run into said elevator, which carries the same up and deposits it in the hopper J, or in a suitable conveyer, which carries it to the drier-plant. Thus the operation goes on, the sewage being discharged into one settling-chamber while the elevator is removing the sediment from the other. The clarified and deodorized water discharged into the well E is removed therefrom by the pump G.

We do not wish to confine ourselves to the exact construction and arrangement of the details of our apparatus shown in the drawings, as the same may be variously modified without departing from the spirit and intent of our invention.

We claim—

1. The combination, in sewage apparatus, of a settling-chamber into which the sewage is discharged, and a conduit having open ends and closed sides leading laterally out of the side of said settling-chamber, above the bottom thereof, and divided by transverse screens into compartments which are filled with suitable filtering material, said conduit having movable sections, whereby the filtering material in each compartment may be renewed without disturbing that in the other compartments, substantially as and for the purposes set forth.

2. The combination, in sewage apparatus, of two settling-chambers connected by branches with the sewer-main, a gate arranged to direct the sewage into either branch and exclude it from the other, or direct it into both branches at the same time, and conduits leading laterally out from the sides of each settling-chamber, above the bottom thereof, and divided by upright screens into compartments which are filled with suitable filtering material, substantially as and for the purposes set forth.

3. The combination, in sewage apparatus, of two settling-chambers connected by branches with the sewer-main, a valve or gate at the junction of said branches with the main, arranged to divert the sewage into either branch and cut it off from the other, a separate elevator-well somewhat deeper than said settling-chambers, provided with hoisting apparatus, a conduit leading from the bottom of each settling-chamber into said well, downwardly-inclined filtering-conduits leading laterally out from the sides of said settling-chambers, above the bottoms thereof, and divided transversely by upright screens into compartments which are supplied with filtering material, and a well into which said filtering-conduits discharge, substantially as and for the purposes set forth.

4. The combination, in sewage apparatus, of a settling-chamber into which the sewage is discharged, a downwardly-inclined filtering-conduit leading laterally out from the side of said chamber, above the bottom thereof, and provided with upright screens between which is interposed filtering material, a well provided with a cage having closed sides and horizontal screens between which is interposed filtering and deodorizing material and upon which said conduit discharges, means for removing the sediment from said settling-chamber and means for removing the water from said well, substantially as and for the purposes set forth.

5. The combination, in sewage apparatus, of two or more settling-chambers connected by branches with the sewer-main, a gate or valve arranged to close either branch and open the other, an elevator-well somewhat deeper than said settling-chambers and provided with hoisting apparatus and communicating through openings with the lowest parts of the settling-chambers, the bottoms of which are inclined downwardly toward said openings, cut-offs arranged to open and close the openings from the settling-chambers into the elevator-well, filtering-conduits leading laterally out of the sides of said chambers and divided by upright screens into compartments which are filled with filtering material, movable sections in said conduits, whereby access is had to said screens and filtering material, and a well into which said conduits open at their discharging ends, substantially as and for the purposes set forth.

In testimony that we claim the foregoing as our own we affix our signatures in presence of two witnesses.

OLUF E. MEYER.
CHARLES H. WECK.

Witnesses:
CHAS. L. GOSS,
FRANK A. KREHLA.